United States Patent [19]

Vollenweider

[11] Patent Number: 5,209,062
[45] Date of Patent: May 11, 1993

[54] LARGE DIESEL ENGINE

[75] Inventor: Jakob Vollenweider, Winterthur, Switzerland

[73] Assignee: Sulzer Brothers Limited, Winterthur, Switzerland

[21] Appl. No.: 731,751

[22] Filed: Jul. 16, 1991

[30] Foreign Application Priority Data

Jul. 27, 1990 [CH] Switzerland ............ 02502/90

[51] Int. Cl.$^5$ ............................................. F01N 3/24
[52] U.S. Cl. .................................... 60/280; 60/302; 60/301; 60/303; 60/317; 422/177; 422/180
[58] Field of Search ............ 60/280, 282, 295, 298, 60/302, 301, 303, 317; 422/180, 177

[56] References Cited

U.S. PATENT DOCUMENTS

| | | | |
|---|---|---|---|
| 2,674,521 | 4/1954 | Houdry | 60/280 |
| 3,911,676 | 10/1975 | Jensen | 60/301 |
| 3,935,705 | 2/1976 | Hergoualch | 60/302 |
| 3,966,443 | 6/1976 | Okano et al. | 55/337 |
| 3,986,350 | 10/1976 | Schmidt | 60/274 |
| 4,155,986 | 5/1979 | Gladden | 423/212 |
| 4,672,809 | 6/1987 | Cornelison et al. | 60/299 |
| 4,719,090 | 1/1988 | Masaki | 422/180 |
| 4,854,123 | 8/1989 | Inoue | 60/274 |
| 4,946,659 | 8/1990 | Held et al. | 423/212 |

FOREIGN PATENT DOCUMENTS

| | | | |
|---|---|---|---|
| 0070619 | 1/1983 | European Pat. Off. | 60/302 |
| 2247016 | 3/1974 | Fed. Rep. of Germany | 60/301 |
| 3830045 | 3/1990 | Fed. Rep. of Germany . | |
| 2479323 | 10/1981 | France . | |
| 0135920 | 6/1986 | Japan | 60/301 |
| 0057810 | 3/1988 | Japan | 60/301 |
| 2000046 | 1/1979 | United Kingdom | 60/302 |
| 2047888 | 11/1981 | United Kingdom | 60/302 |

OTHER PUBLICATIONS

Patent Abstracts of Japan, vol. 12, No. 478 (M-775) 14 Dec. 1988 (63-198713).
Patent Abstracts of Japan, vol. 9, No. 317 (C-319) 12 Dec. 1985 (60-153922).

Primary Examiner—Ira S. Lazarus
Assistant Examiner—L. Heyman
Attorney, Agent, or Firm—Francis C. Hand

[57] ABSTRACT

A large diesel engine is provided with a manifold arrangement in which a catalytically coated static mixer is disposed within an exhaust manifold. In addition, nozzles are provided in an annular chamber between the static mixer and the exhaust manifold in order to introduce a reducing agent into the flow of exhaust gas prior to entry into the static mixer. Alternatively, the reducing agent can be injected via a nozzle centrally located in a cover at the end of the manifold.

20 Claims, 5 Drawing Sheets

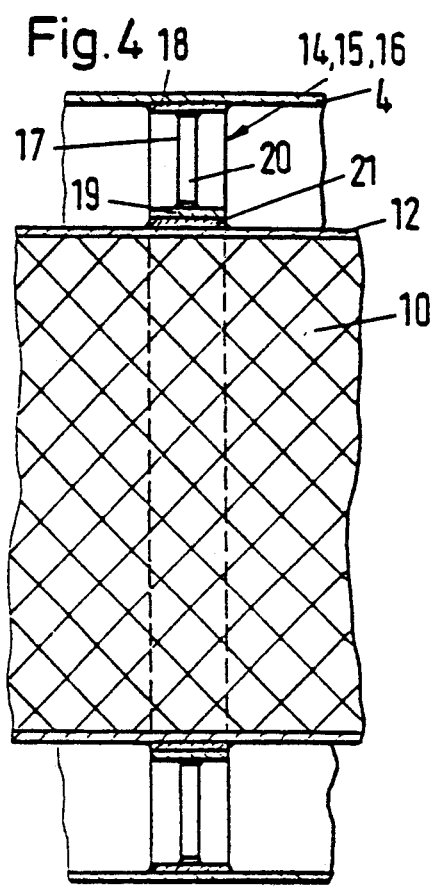
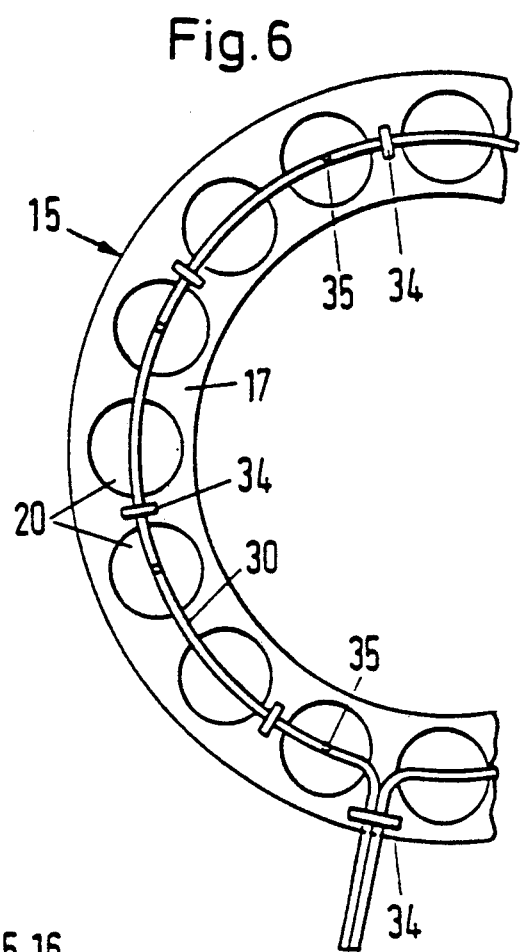
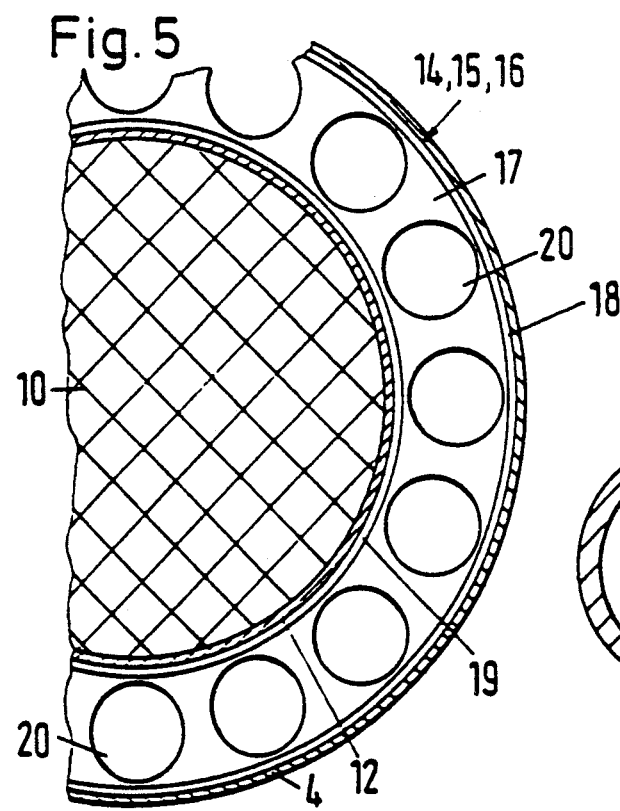
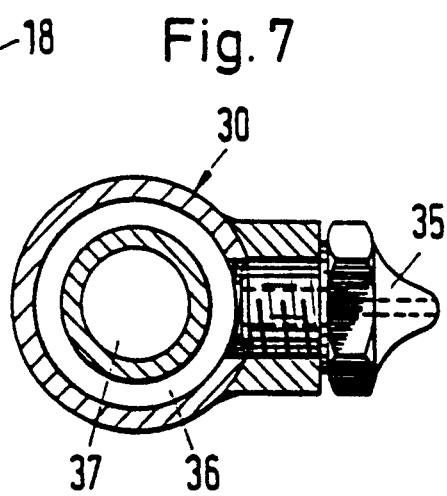

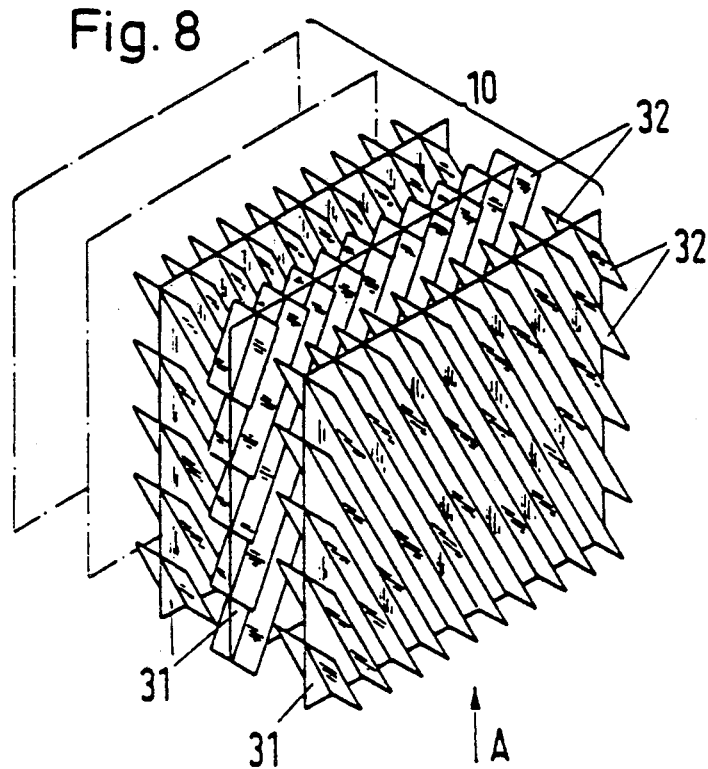
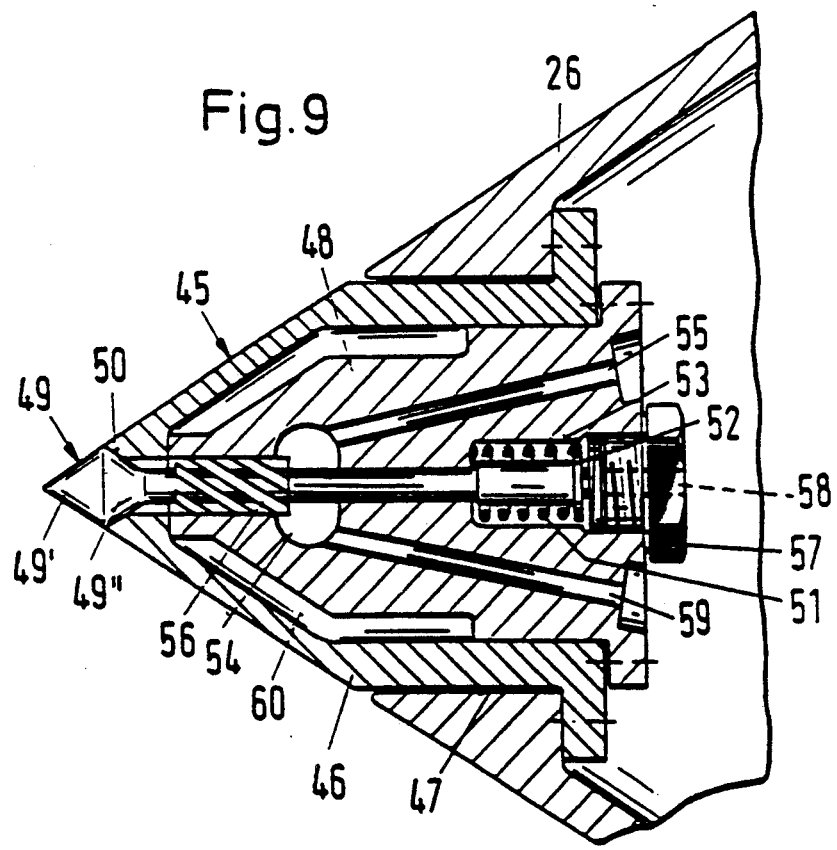

LARGE DIESEL ENGINE

This invention relates to a large diesel engine. More particularly, this invention relates to an exhaust manifold arrangement for a large diesel engine.

Due to the world-wide increase in the severity of regulations for protecting the environment, even large diesel engines, e.g., for the propulsion of tankers, have to be adapted so as to reduce the emission of pollutants, more particularly nitrogen oxides. One method, mainly for removing nitrogen from the exhaust gases from combustion furnaces, is "selective catalytic reduction" (SCR), where the nitrogen oxides are catalytically reduced to nitrogen and water by ammonia or an ammonia carrier. However, a serious problem in the SCR method is the large amount of space needed for commercial catalysts. When the SCR method is applied to large diesel engines, therefore, space for the catalysts is taken up in addition to space for the engine, and this complicates the installation containing the engine and presents problems, particularly in marine applications.

Other types of arrangements have also been known, for example from German O.S. 38 30 045 for passing exhaust gases through. Various types of filters such as zeolite filters and the like in order to remove various impurities. Similar types of filter arrangements have also been described in U.S. Pat. No. 3,966,443. However, such arrangements are not particularly effective in removing nitrogen oxides from the gases.

French Patent 2,479,323 describes the use of a catalyst bed for removing pollutants emitted from internal combustion engines. However, the described arrangement requires a considerable amount of space. Other types of structures and techniques have also been described in Japanese Pat. 60-153922 wherein use is made of a static mixer for the mixing together of a reducing agent and an exhaust gas with subsequent removal of a noxious substance in a separation apparatus. Japanese Patent 63-198713 also describes a method for removing nitrogen oxides from a diesel engine by mixing the exhaust gas from a diesel engine with a reducing agent in the presence of a catalyst.

Accordingly, it is an object of the invention to greatly reduce the emission of nitrogen oxides from a large diesel engine without requiring additional room for a catalyst in addition to the space for the engine.

It is another object of the invention to provide a compact exhaust manifold arrangement for a large diesel engine which is capable of removing nitrogen oxides in an efficient manner.

Briefly, the invention provides a diesel engine which is constructed with a plurality of cylinders and an exhaust gas manifold connected to the cylinders in order to receive a flow of exhaust gas from each cylinder. In accordance with the invention, a static mixer is disposed in the manifold with a catalyst coating thereon while means are provided in the manifold for supplying a reducing agent into the flow of exhaust gas upstream of the static mixer.

In addition, a tube is concentrically disposed in the manifold in order to house the static mixer and to define an annular chamber therebetween which is in communication with the cylinders in order to receive the flow of exhaust gas.

In order to guide the flow of exhaust gas containing the reducing agent from the annular chamber between the manifold and the tube into the static mixer, a guide ring is provided in the manifold at one end. In addition, the guide ring widens internally in the direction of gas flow into the static mixer and is provided with a plurality of guide vanes which communicate with the annular chamber in order to neutralize a twist in the flow of exhaust gas passing from the annular chamber into the static mixer.

During operation, the flow of exhaust gas flowing into the manifold receives a supply of reducing agent upstream of the place where the exhaust gas enters into contact with the catalyst coating on the static mixer. Thereafter, the exhaust gas with the reducing agent is received and mixed within the static mixer in order to bring about a catalytic reaction whereby nitrogen oxides are removed from the exhaust gas. To this end, the reducing agent which is used may be urea dissolved in water while the catalytic coating on the static mixer is of any suitable type to effect the catalytic reaction desired.

Due to the use of a station mixer, the space required for the catalyst is small enough for the catalyst to be incorporated in the exhaust manifold. This avoids complicating the engine and does not reduce the useful space surrounding the engine.

These and other objects and advantages of the invention will become more apparent from the following detailed description taken in conjunction with the accompanying drawings wherein:

FIG. 4 illustrates an enlarged detail of FIG. 3;

FIG. 5 illustrates a partial view of a support ring within the manifold of the arrangement of FIG. 3;

FIG. 6 illustrates a partial view of the ring of FIG. 5 with a means for supplying a reducing agent in accordance with the invention;

FIG. 7 illustrates a cross-sectional view of a nozzle for supplying a reducing agent in accordance with the invention;

FIG. 8 illustrates a perspective view of a static mixer constructed in accordance With the invention; and FIG. 9 illustrates a cross-sectional view of a modified nozzle for delivering reducing agents in accordance with the invention.

Figure 1:
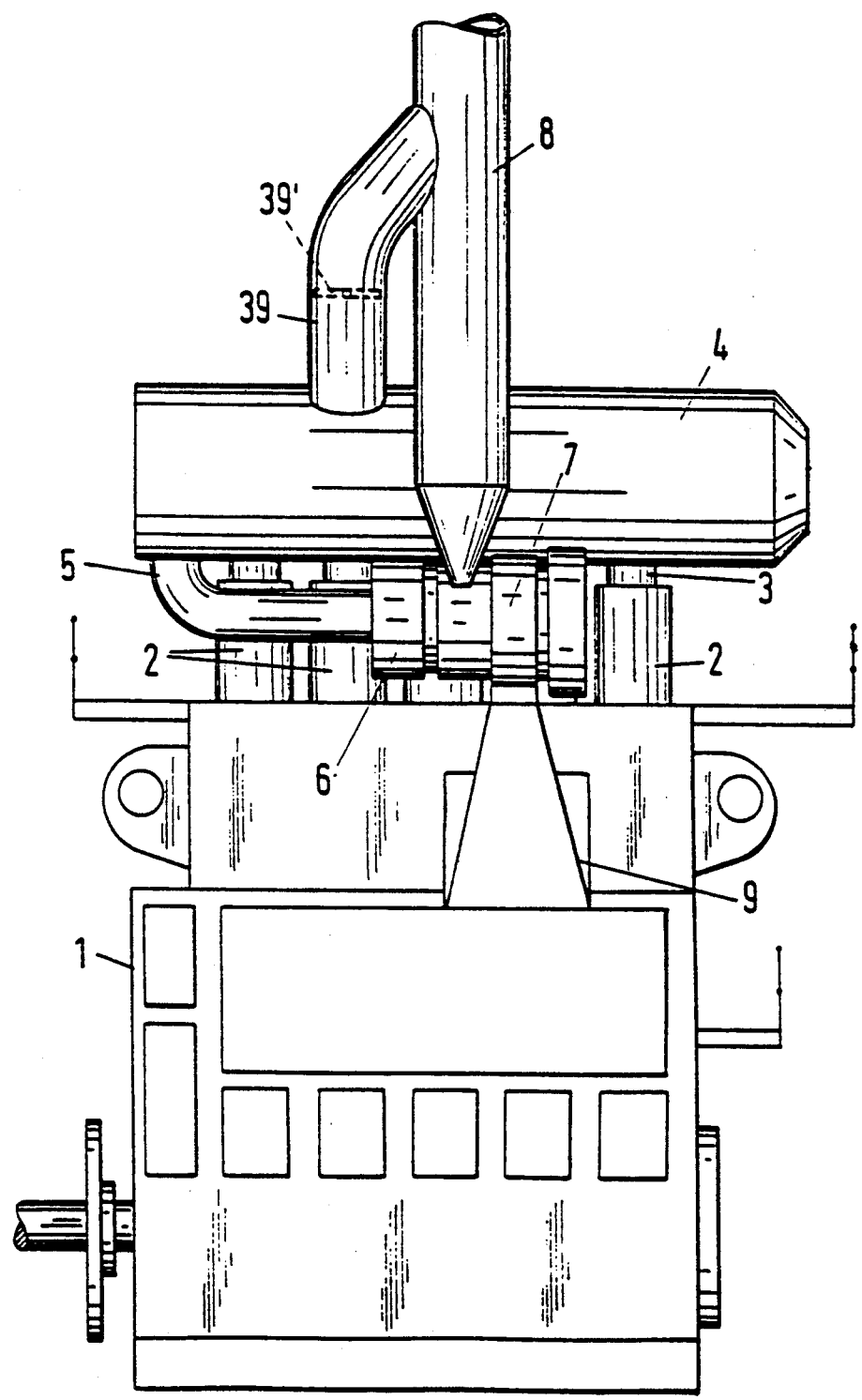
FIG. 1 illustrates a diagrammatic side view of a large diesel engine constructed in accordance with the invention.

Referring to FIG. 1, the diesel engine 1 is constructed as a slow-running two stroke large diesel engine of generally known type having a plurality of cylinders 2 for example, five cylinders, in line. As illustrated, each cylinder 2 is connected by an exhaust pipe 3 to a common exhaust gas manifold 4 of cylindrical shape which is disposed on a horizontal axis above the cylinders 2. As indicated in FIGS. 2 and 3, exhaust pipes 3 are distributed along the exhaust manifold 4 and open tangentially into inlets of the manifold 4.

Figure 3:
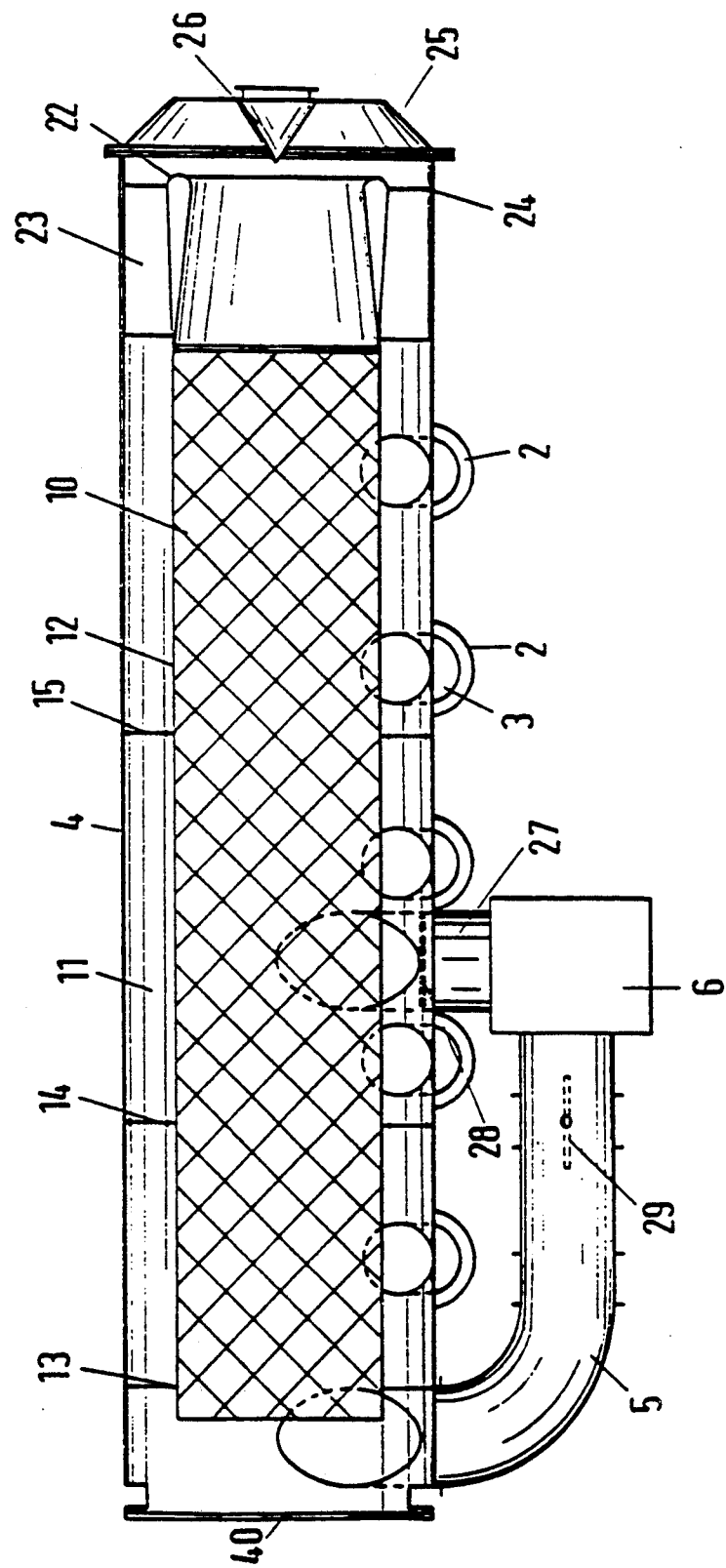
FIG. 3 illustrates a horizontal cross-sectional view through an exhaust manifold arrangement constructed in accordance with the invention.

Referring to FIGS. 1 and 3, a line 5 branches off from the left-hand end of the exhaust manifold 4, as viewed, and leads to an exhaust gas turbine 6 which directly drives a supercharger 7 In addition, as shown in FIG. 1, a flue 8 through which the gas expanded in the turbine 6 escapes to atmosphere is connected to a casing of the turbine between the turbine 6 and the supercharger 7. A charging air cooler 9 through which compressed fresh air is supplied (not shown) to the lower ends of the cylinders 2 is also provided under the supercharger 7.

Figure 2:
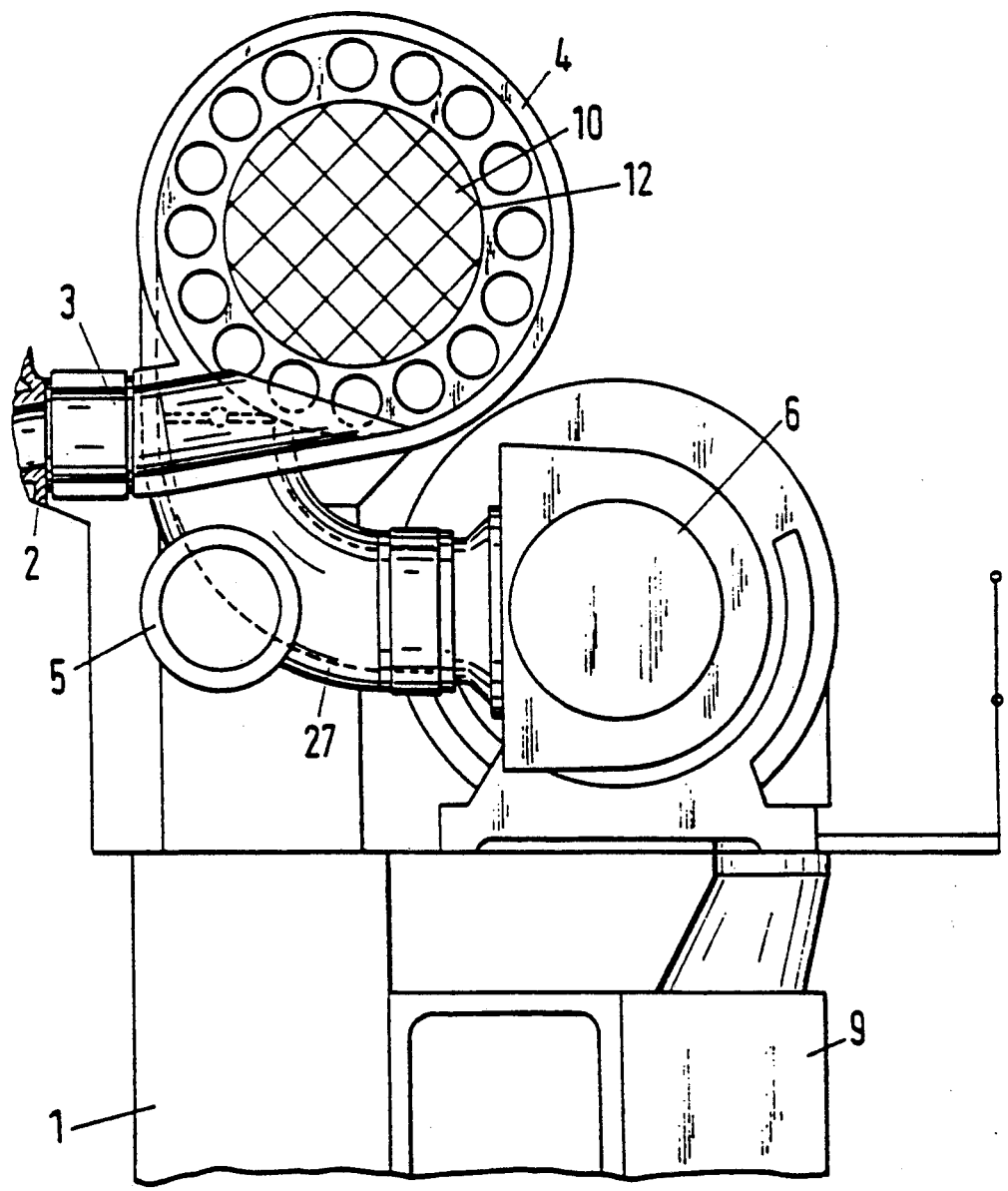
FIG. 2 illustrates a diagrammatic front view of the top part of the diesel engine of FIG. 1.

Referring to FIGS. 2 and 3, a static mixer 10 is disposed in the manifold 4 and is provided with a catalyst coating thereon. As indicated, the static mixer 10 is contained within a tube 12 which is concentrically disposed in the manifold 4 in order to define an annular chamber 11 therebetween in communication with the cylinders 2. This tube 12, is in turn supported by three rings 13, 14, 15 within the manifold 4.

The static mixer 10 fills the center of the exhaust manifold cross-section and extends over a considerable part of the length of the exhaust manifold 4. The static mixer 10 may be constructed in a form such as shown in FIG. 8 wherein the static mixer 10 is comprised of a plurality of vertically disposed metal sheets 31 each of which is coated with catalytic material. In addition, the mixer 10 includes a plurality of parallel guide elements 32 which are inclined to the vertical and which are welded or otherwise secured at right angles to the sheets 31. As indicated, adjacent rows of the guide elements 32 are disposed in crossing relation. As a result, the exhaust gas flowing through the static mixer 10 in the direction indicated by the arrow A is divided into a plurality of partial streams which intersect at about 90°.

A number of sheets 31 are superposed in a stack and a plurality of such stacks are disposed one behind the other in the direction of gas flow in the exhaust manifold 4. The complete set of catalyst stacks form a cylindrical outline in the direction of the arrow A so as to fit within the cylindrical tube 12.

The tube 12 is supported by two supporting rings, 14, 15 in a middle zone. Each of these rings 14, 15 is identical and, as shown in FIGS. 4 and 5, comprises a ring disc 17, an outer ring 18 welded thereto and an inner ring 19 welded thereto. In addition, the ring disc 17 is provided with a plurality of round apertures 20 which are circumferentially disposed so as to enable gas to flow therethrough within the annular chamber 11. As indicated, the outer ring 18 is welded to the manifold 4 whereas the inner ring 19 can move axially on a sliding ring 21 welded to the tube 12.

Referring to FIG. 3, the supporting ring 13 at the left-hand end of the tube 12 is formed as a closed ring disc, that is, without apertures to close off the chamber 11. The outer periphery of this ring 13 is welded to the exhaust manifold 4 as well as its inner periphery to the tube 12 so that no gas can flow from the annular chamber 11 to the left, as viewed. As indicated, a releasably connected cover 40 is secured over the left-hand end of the exhaust manifold 4.

Referring to FIG. 3, a guide ring 22 is disposed within the manifold 4 in alignment with the annular chamber 11 in order to guide a flow of exhaust gas from the chamber 11 axially into the static mixer 10. As indicated, this guide ring 22 widens internally in the direction of gas flow into the static mixer 10 that is, the guide ring 22 has an internal diameter which decreases in the direction of gas flow in the annular chamber 11. In addition, the guide ring 22 has a plurality of guide vanes 23 which communicate with the annular chamber 11 in order to neutralize a twist in the flow of exhaust gas passing from the chamber 11 towards the static mixer 10. These blades 23 which are made of suitably bent sheet metal have inner longitudinal edges welded to the guide ring 22 and to a ring 24 at the outer longitudinal edges. As indicated, the outer ring 24 bears against the exhaust manifold 4 and at the right-hand end, merges into an outwardly projecting flange. In this manner, the guide ring 22, blades 23 and outer ring 24 form a structural unit which can be inserted into the manifold 4. The left end of the ring 22 projects somewhat into the pipe 12.

In addition, a cover 25 is secured over the righthand end of the manifold 4 opposite to and spaced from the guide ring 22 in order to permit a flow of gas to pass from the chamber 11 and guide ring blades 23 into the interior of the ring 22 and the static mixer 10. In addition, a guide cone 26 is provided on the cover coaxial with the static mixer 10 and centrally of the cover 25. As indicated, the cone 26 tapers towards the guide ring 22 and aids in guiding the exhaust gas into the guide ring 22. Further, the cover 25 is releasably connected to the exhaust manifold 4 by flanges between which the flange of the ring 24 is clamped.

Referring to FIG. 6, the diesel engine is provided with a suitable means in the manifold 4 for supplying a reducing agent into the flow of exhaust gas passing through the chamber 11 upstream of the static mixer 10. To this end, the means includes a ring conduit 30 which is secured by clips 34 to the ring disc 17 of the supporting ring 15. This ring conduit 30 is disposed on the side of the ring disc 17 remote from the gas flow and extends approximately in the middle of the apertures 20 therein. In addition, a plurality of nozzles are uniformly distributed along the length of the ring conduit 30 and over the periphery of the ring disc 17 in order to discharge a reducing agent, such as, urea dissolved in water, in the direction of gas flow. In the embodiment shown in FIG. 6, a nozzle 35 is provided at every other aperture.

Referring to FIG. 7, the ring conduit 30 is double-walled in order to define an outer chamber 36 for conveying the reducing agent to the nozzles 35 and an inner chamber 37 for conveying a coolant therethrough. To this end, the annular chamber 36 is connected to a source (not shown) of the reducing agent while the inner chamber 37 is connected to a cooling water supply (not shown).

During operation, exhaust gas originating in the cylinders 2 flows through the exhaust pipes 3 into the annular chamber 11 in the exhaust manifold 4. The gas then flows with a twist to the right in FIG. 3 towards the flow guide ring 22, where the twist is neutralized or rectified by the blades 23. The exhaust gas is then guided in the chamber bounded by cover 25, assisted by the guide cone 26, into the diffuser chamber surrounded by the guide ring 22, and then flows through the catalyst-coated static mixer 10. The reducing agent is supplied via the ring conduit 30 on the supporting ring 15, so that the nitrogen oxide in the gas is converted, in known manner, into nitrogen and water vapor in the catalyst bed defined by the static mixer 10. The exhaust gas, thus substantially freed from nitrogen oxide, travels through the line 5 to the exhaust-gas turbine 6 in which the enthalpy of the exhaust gas is used in known manner for supplying fresh air at elevated pressure to the engine 1.

As shown in FIGS. 2 and 3, a line 27 is connected to the exhaust manifold 4 and opens into the exhaust-gas turbine 6 and is provided with an adjustable valve 28 (FIG. 3) to selectively open and close the line 27. A second valve 29 is also provided in the line 5 to selectively open and close this line 5. Thus, upon closing of the line 5 via the valve 29 and opening of the line 27 via the valve 28, the exhaust gas can bypass the static mixer 10, i.e., the exhaust gas can be directly conveyed from the annular chamber 11 to the exhaust-gas turbine 6. During this catalyst bypass operation, air or water instead of the reducing agent can be conveyed through the annular chamber 36 in the ring conduit 30, so as to prevent contaminating the environment with unreacted reducing agent vapor and also prevent the nozzles 35 from clogging.

In order to enable the exhaust gas to bypass the turbine 6, a line 39 including a valve 39' to selectively open and close the line 39 is connected to the exhaust manifold 4 and opens into the flue 8. In the event of an operation without an exhaust-gas turbine, accordingly, the valve 39' is opened and the two valves 28 and 29 are closed, whereupon the exhaust gas flows from the annular chamber 11 through the line 39 directly into the flue 8.

FIG. 9 shows an embodiment in which the reducing agent is supplied through a single nozzle 45 disposed at the tip of the guide cone 26. The nozzle 45 has a casing 46 25 comprising a cylindrical portion which rests in a bore 47 in the guide cone 26 and a conical portion which continues the outer surface of cone 26. A needle-like closure member 49 is axially movable in the center of an insert 48 disposed in the casing 46. The left end of the closure member 49 in FIG. 9 is in the form of a double cone and, in the closed position shown, the left cone 49' prolongs the outer conical surface of casing 46, whereas the other cone 49'' forms a sealing surface which cooperates with a corresponding conical seat 50 in casing 46. In order to hold the closure member 49 in the closed position as shown, a helical spring 51 is provided at the end of the member 49 remote from the double cone and extends between a plate 52 secured to the closure member 49 and a bore 53 in the insert 48. A reducing agent is supplied through a bore 55 to an annular chamber 54 formed in the insert 48 between the helical spring 51 and the double cone of the closure member 49. Ribs 56 in the form of a trapezoidal thread are formed on the closure member 49 between the annular chamber 54 and the double cone and impart a twist to the reducing agent when the closure member is in the open position. A closure screw 57 is screwed into bore 53 and has a central bore 58 for discharging any material which leaks between the closure member 49 and the surrounding guide bore in the insert 48.

The insert 48 also has a bore 59 which leads to the annular chamber 54 and through which a cleaning agent, such as water, can be supplied. This prevents the reducing agent from crystallising in the various separate chambers in nozzle 45 when inoperative and, thus, jamming the closure member 49. An annular space 60 for supplying cooling water (not shown) is provided between the insert 48 and casing 46.

When the nozzle 45 is in operation, the pressure of the reducing agent supplied through the bore 55 pushes the closure member 49 in the opening direction, with the result that twisting reducing agent enters the gas flow deflected by the ring 22 (FIG. 3) and mixes with the exhaust gas before the mixture enters the static mixer 10.

The large diesel engine is of use both for marine propulsion and for driving electricity generators in stationary diesel power plants.

The invention thus provide an exhaust manifold arrangement for a large diesel engine which is of compact construction requiring a relatively small amount of space.

The catalyst coating consists of a mixture of vanadium pentoxide $V_2O_5$, tungsten bioxide $WO_3$ and titanium dioxide $TiO_2$.

What is claimed is:
1. A diesel engine comprising
a plurality of cylinders;
an exhaust gas manifold connected to said cylinders to receive as flow of exhaust gas from each cylinder;
a tube concentrically disposed in said manifold to define an annular chamber therebetween in communication with said cylinders;
a static mixer extending in said tube with a catalyst coating thereon, said static mixer having a plurality of sheets distributed over the cross-section of said tube in the flow direction of the exhaust gas and parallel guide elements on said sheets, adjacent rows of said guide elements being disposed in crossing relation and inclined to said flow direction; and
means in said manifold for supplying a reducing agent into a flow of exhaust gas passing therethrough upstream of said static mixer.

2. A diesel engine as set forth in claim 1 which further comprises a guide ring in said manifold at one end thereof, said guide ring being aligned with said annular chamber to guide a flow of exhaust gas therefrom axially into said static mixer within said tube.

3. A diesel engine as set forth in claim 2 wherein said guide ring has an internal diameter which decreases in the direction of gas flow in said annular chamber.

4. A diesel engine as set forth in claim 2 wherein said guide ring has a plurality of guide vanes communicating with said annular chamber to neutralize a twist in a flow of exhaust gas passing from said chamber into said static mixer.

5. A diesel engine as set forth in claim 4 which further comprises a ring secured externally to said blades to define a structural unit with said guide ring for fitting in said manifold.

6. A diesel engine as set forth in claim 2 which further comprises a cover secured to one end of said manifold opposite said guide ring to guide a flow of exhaust gas therebetween.

7. A diesel engine as set forth in claim 6 which further comprises a guide cone on said cover coaxial of said static mixer.

8. A diesel engine as set forth in claim 1 wherein said means includes a ring conduit in said annular chamber and a plurality of nozzles communicating with said conduit for spraying a reducing agent into said chamber.

9. A diesel engine as set forth in claim 8 wherein said conduit is double-walled to define an outer chamber for conveying reducing agent to said nozzles and an inner chamber for conveying a coolant therethrough.

10. A diesel engine as set forth in claim 1 which further comprises a cover secured to one end of said manifold opposite said static mixer and said means is disposed centrally of said cover.

11. A diesel engine as set forth in claim 10 which further comprises a guide cone on said cover coaxial of said static mixer and wherein said means in said manifold is a valve disposed centrally of said cone.

12. A diesel engine as set forth in claim 1 which further comprises a turbo charger downstream of said static mixer relative to a flow of exhaust gas therethrough.

13. A diesel engine as set forth in claim 1 which further comprises a first line extending from said manifold and being in communication with an outlet end of said static mixer to exhaust a flow of gas therefrom; a gas turbine connected to said line to receive a flow of gas therefrom; and a supercharger connected to said turbine to be driven thereby.

14. A diesel engine as set forth in claim 13 which further comprises a second line extending between said annular chamber and said turbine, a first valve in said first line to selectively open and close said first line, and a second valve in said second line to selectively open and close said second line whereby upon closing of said first line and opening of said second line a flow of exhaust gas is bypassed about said static mixer.

15. A diesel engine as set forth in claim 14 which further comprises a flue in communication with said turbine for exhausting gas therefrom, a third line extending between said annular chamber and said flue, and a third valve in said third line to selectively open and close said third line whereby upon closing of said first and second valves and opening of said third valve a flow of exhaust gas is bypassed about said static mixer and said turbine.

16. An exhaust manifold arrangement for a diesel engine comprising:
   an exhaust manifold having a plurality of inlets for receiving flows of exhaust gas;
   a tube concentrically within said manifold to define an annular chamber therebetween, said chamber being in communication with said inlets and being closed at one end;
   means for supplying a reducing agent into said chamber for mixing with a flow of exhaust gas therein;
   a static mixer disposed in said tube for receiving and mixing the exhaust gas and reducing agent therein, said static mixer having a plurality of sheets distributed over the corss-section of said tube in the flow direction of the exhaust gas and parallel guide elements on said sheets, adjacent rows of said guide elements being disposed in crossing relation and inclined to said flow direction;
   a cover mounted over one end of said manifold in spaced relation to a second end of said annular chamber and said static mixer to permit a flow of exhaust gas to pass from said chamber into said static mixer; and
   a catalyst coating provided on said mixer.

17. An exhaust manifold arrangement as set forth in claim 16 which further comprises a guide ring between said static mixer and said cover, a plurality of guide vanes on said ring for guiding a flow of exhaust gas from said annular chamber towards said cover and said static mixer.

18. An exhaust manifold arrangement as set forth in claim 16 wherein said means includes a ring conduit in said annular chamber and a plurality of nozzles communicating with said conduit for spraying a reducing agent into said chamber.

19. An exhaust manifold arrangement as set forth in claim 16 which further comprises a guide cone on said cover coaxial of said static mixer and wherein said means is a valve disposed centrally of said cone.

20. A diesel engine comprising
   a plurality of cylinders;
   an exhaust gas manifold connected to said cylinders to receive a flow of exhaust gas from each cylinder;
   a tube concentrically disposed in said manifold to define an annular chamber therebetween in communication with said cylinders;
   a static mixer extending within said tube with a catalyst coating thereon;
   a guide ring in said manifold at one end thereof, said guide ring being aligned with said annular chamber to guide a flow of exhaust gas therefrom axially into said static mixer within said tube; and
   means in said manifold for supplying a reducing agent into a flow of exhaust gas passing therethrough upstream of said static mixer.

* * * * *

UNITED STATES PATENT AND TRADEMARK OFFICE
CERTIFICATE OF CORRECTION

PATENT NO. :  5,209,062
DATED      :  May 11, 1993
INVENTOR(S):  Jakob Vollenweider It is certified that error appears in the above-identified patent and that said Letters Patent is hereby corrected as shown below:

Column 5, line 21, cancel "25"
Column 6, line 2, change "bioxide" to -trioxide-

Signed and Sealed this

Fourteenth Day of December, 1993

Attest:

BRUCE LEHMAN

Attesting Officer

Commissioner of Patents and Trademarks